United States Patent
Sawina et al.

(10) Patent No.: US 10,706,016 B2
(45) Date of Patent: Jul. 7, 2020

(54) APPLICATION TRACKING SYSTEM

(71) Applicant: International Business Machines Corporation, Armonk, NY (US)

(72) Inventors: Grzegorz Sawina, Cracow (PL); Marcin Labenski, Cracow (PL); Joanna Barbara Koza, Cracow (PL); Tomasz A. Stopa, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 15/985,906

(22) Filed: May 22, 2018

(65) Prior Publication Data

US 2019/0361989 A1    Nov. 28, 2019

(51) Int. Cl.
*G06F 9/44* (2018.01)
*G06F 16/17* (2019.01)
*G06F 11/34* (2006.01)
*G06F 21/10* (2013.01)

(52) U.S. Cl.
CPC ...... *G06F 16/1734* (2019.01); *G06F 11/3409* (2013.01); *G06F 11/3466* (2013.01); *G06F 21/105* (2013.01); *G06F 2201/865* (2013.01)

(58) Field of Classification Search
CPC ............. G06F 11/3409; G06F 11/3466; G06F 16/1734; G06F 21/105; G06F 2201/865
See application file for complete search history.

(56) References Cited

U.S. PATENT DOCUMENTS

| 8,521,865 B2 | 8/2013 | D'Slo et al. |
| 2004/0054987 A1 | 3/2004 | Sonpar et al. |
| 2007/0198423 A1 | 8/2007 | Carbone et al. |
| 2010/0325149 A1 | 12/2010 | Etchegoyen |
| 2012/0143821 A1* | 6/2012 | Mallya .................. H04L 41/046 707/639 |
| 2014/0189102 A1* | 7/2014 | Fruchtman ............ G06F 21/105 709/224 |
| 2015/0032415 A1 | 1/2015 | Van Cutsem et al. |
| 2019/0318064 A1* | 10/2019 | Paladino ............. G06F 11/3442 |

OTHER PUBLICATIONS

Anonymously, Method for CPU usage limitation by software/filesystem scanners, IP.com, Oct. 24, 2013, retrieved online on Feb. 26, 2020, pp. 1-3. Retrieved from the Internet: <URL: https://priorart.ip.com/IPCOM/000232180>. (Year: 2013).*

"Monitor Files, Network File Monitoring Using PRTG," Paessler AG, copyright 2017, 22 pages. https://www.paessler.com/monitor_file.

"Splunk Clouds™ Getting Data in 6.6.3, Monitor changes to your file system," Splunk Inc., generated Dec. 14, 2017, copyright 2017, 8 pages. http://docs.splunk.com/Documentation/SplunkCloud/6.6.3/Data/Monitorchangestoyourfilesystem.

* cited by examiner

*Primary Examiner* — Hanh Thi-Minh Bui
(74) *Attorney, Agent, or Firm* — Yee & Associates, P.C.

(57) ABSTRACT

A method for monitoring software usage for an application installed in a computer system. The computer system determines whether a change has occurred in a set of files stored in a set of directories for the application in a file system between inventory scans of the file system. The set of the files is associated with the application and the set of the files changes when the application is used. A usage metric for the application is adjusted by the computer system to indicate a use of the application when the change has occurred in the set of the files, increasing accuracy, by the computer system, in identifying application usage.

18 Claims, 7 Drawing Sheets

APPLICATION TRACKING SYSTEM

BACKGROUND

1. Field

The present disclosure relates generally to an improved computer system and, more specifically, to a method, an apparatus, a system, and a computer program product for tracking usage of applications in a computer system.

2. Description of the Related Art

Software asset management (SAM) involves managing and optimizing applications used in network data processing systems. This optimization may include optimizing the purchase, deployment, maintenance, utilization, and disposal of software applications in a network data processing system. Software asset management tools are used to gather information about usage statistics for applications deployed in a network data processing system. This information can be used to determine how many licenses are needed for applications.

Current software asset management tools obtain information about applications based on processes running for the applications. Information about processes can be obtained from the operating system on which the processes for the application are running. Monitoring tools, such as a task manager, are used to monitor processes run by the operating system.

This approach, however, does not provide an ability to detect the usage of applications as accurately as desired. For example, identifying application usage from processes involves knowing the unique process name for a particular application. Problems arise from needing to know the process names.

For example, process names are often not identified uniquely to allow for distinguishing between different software versions. As another example, Java and Java 2 Platform Enterprise Edition (J2EE) are defined as "java" for a process name. With web applications, processes for the application may run even if users are not logged in or use a web interface for the web applications. As a result, this information does not accurately indicate whether the web application is being used.

Therefore, it would be desirable to have a method and apparatus that take into account at least some of the issues discussed above, as well as other possible issues. For example, it would be desirable to have a method and apparatus that overcome a technical problem with monitoring usage of an application using currently available information about running processes for the application.

SUMMARY

According to one embodiment of the present invention, a method for monitoring software usage for an application installed in a computer system is provided. The computer system determines whether a change has occurred in a set of files stored in a set of directories for the application in a file system between inventory scans of the file system. The set of the files is associated with the application and the set of the files changes when the application is used. A usage metric for the application is adjusted by the computer system to indicate a use of the application when the change has occurred in the set of the files, increasing accuracy, by the computer system, in identifying application usage.

According to another embodiment of the present invention, an application tracking system comprises a computer system and a usage tracker running on the computer system. The usage tracker determines whether a change has occurred in a set of files stored in a set of directories for an application in a file system between inventory scans of the file system. The set of the files is associated with the application and the set of the files changes when the application is used. The usage tracker adjusts a usage metric for the application to indicate a use of the application when the change has occurred in the set of the files, increasing accuracy, by the computer system, in identifying application usage.

According to yet another embodiment of the present invention, a computer program product for monitoring software usage for an application installed in a computer system is provided. The computer program product comprises a computer-readable storage media, first program code, and second program code. The first program code and the second program code are stored on the computer-readable storage media. The first program code determines whether a change has occurred in a set of files stored in a set of directories for the application in a file system between inventory scans of the file system. The set of the files is associated with the application and the set of the files changes when the application is used. The second program code adjusts a usage metric for the application to indicate a use of the application when the change has occurred in the set of the files, increasing accuracy, by the computer system, in identifying application usage.

DETAILED DESCRIPTION

Figure 1:
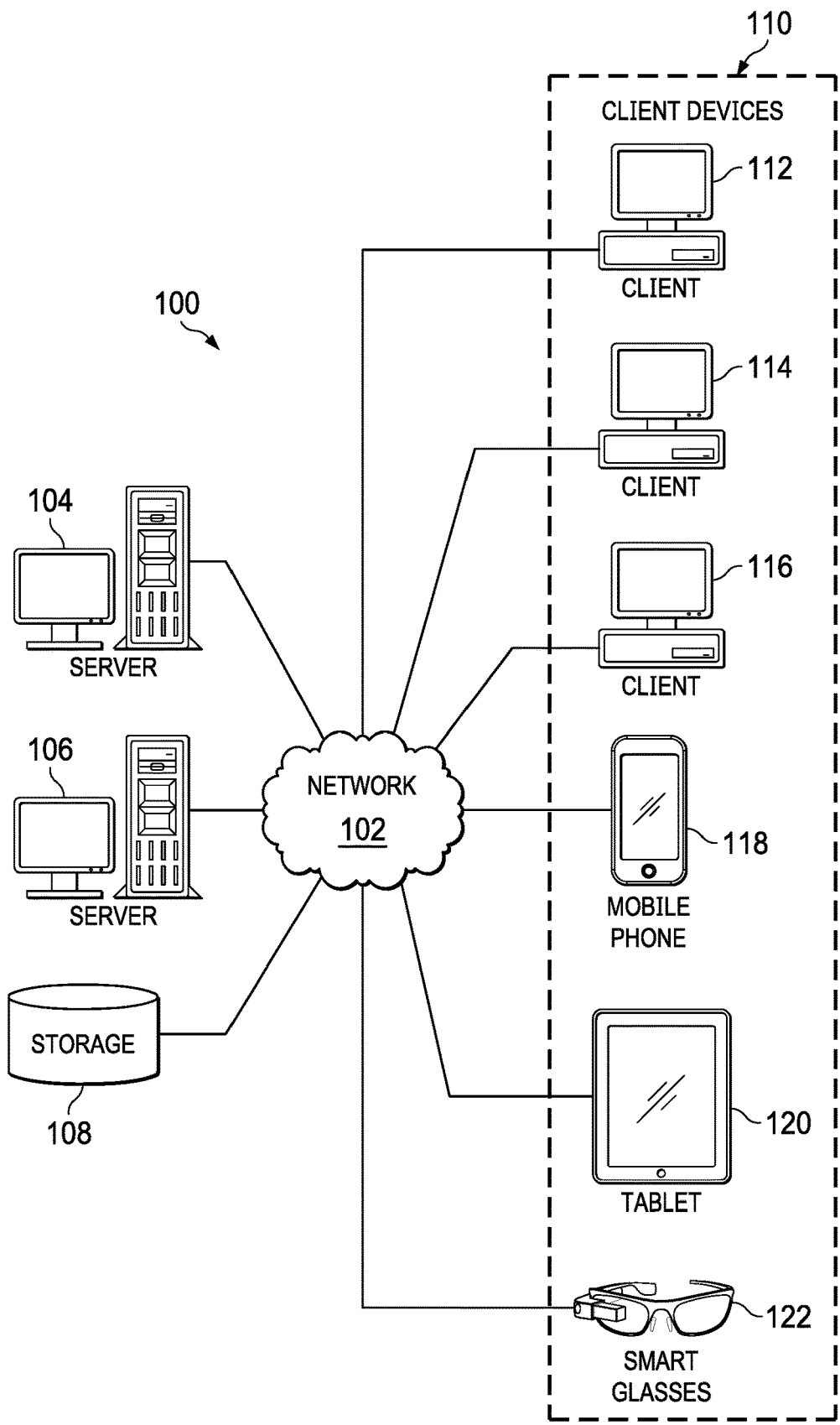
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order as noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that current techniques rely on information about processes to determine whether an application is being used and cannot always identify an application from the process names provided.

The illustrative embodiments also recognize and take into account that customers are interested in knowing what applications are used and how frequently the applications are used for determining how many installations or licenses of an application are needed on a network data processing system. The illustrative embodiments recognize and take into account that customers are usually not interested in very detailed application usage statistics. The illustrative embodiments also recognize and take into account that in many cases whether an application was not used at all, used but not always, or used regularly within a reporting period is sufficient information. The illustrative embodiments recognize and take into account that analyzing information from inventory scans of a file system where the application is located can provide sufficient information about the usage of the application.

Thus, the illustrative embodiments provide a method, an apparatus, a system, and a computer program product for monitoring usage of an application installed on a computer system. In one illustrative example, the computer system determines whether a change has occurred in a set of files stored in a set of directories for the application in a file system between inventory scans of the file system. The set of the files is associated with the software application and the set of the files changes when the application is used. The computer system adjusts a usage metric for the application to indicate a use of the application when the usage signature has changed, increasing accuracy, by the computer system, in identifying application usage. As used herein, a "set of" when used with reference to items, means one or more items. For example, a set of files is one or more files.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices, such as mobile phone 118, tablet computer 120, and smart glasses 122. In this illustrative example, some or all of client devices 110 may form an Internet of things (IOT) in which these physical devices can connect and exchange data.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C, or item B and item C. Of course, any combinations of these items may be present. In some illustrative examples, "at least one of" may be, for example, without limitation, two of item A; one of item B; and ten of item C; four of item B and seven of item C; or other suitable combinations.

Applications are installed in the different data processing systems in network data processing system 100. A usage tracker operates to determine the usage of one or more applications in network data processing system 100. An application can have one or more installations in network data processing system 100. A single installation may have one or more instances that run in network data processing system 100. Each installation or instance may be subject to a license.

The usage tracker operates to obtain and analyze changes in files for applications in which the changes to the files occur when the applications are used. One or more inventory scanners run on network data processing system 100 and perform inventor scans of files systems. The inventory scanners scan file systems that contain applications for which usage information is desired. The scans identify files in directories for the applications. These scans can also include information about the files, such as checksums, file sizes, and content. Changes in these or other properties can occur when the applications are used.

In this example, sets of files for the applications in which the sets of files change when the applications are used can be selected to determine whether the applications were used between inventory scans. In other words, files can be selected for inclusion in the sets of files based on knowing which files change when the applications are used. In this illustrative example, applications are used when the program code for those applications are run by one or more processor units in one or more data processing systems.

As additional inventory scans are run, the results of these scans can be analyzed to determine whether changes in the sets of files have occurred. One or more properties of the sets of files can be examined to determine whether changes in those properties have occurred between scans of the set of files.

For example, the size of files can be the property examined to determine whether a change has occurred in a set of files for an application. The size of the set of files for the application will not change unless the application is used. If the size of one or more files in the set of files changes, the application has been used. Thus, the presence or absence of changes in the set of files through examining the one or more properties of the set of files can be used to determine application usage.

With the application usage information, the operation of network data processing system 100 can be improved. For example, too many installations of an application may be present within network data processing system 100 based on the analysis of the usage of the application. With the usage information, excess installations of the application can be removed from network data processing system 100 freeing up resources in storage 108 or other storage devices located in different data processing systems in network data processing system 100.

Figure 2:
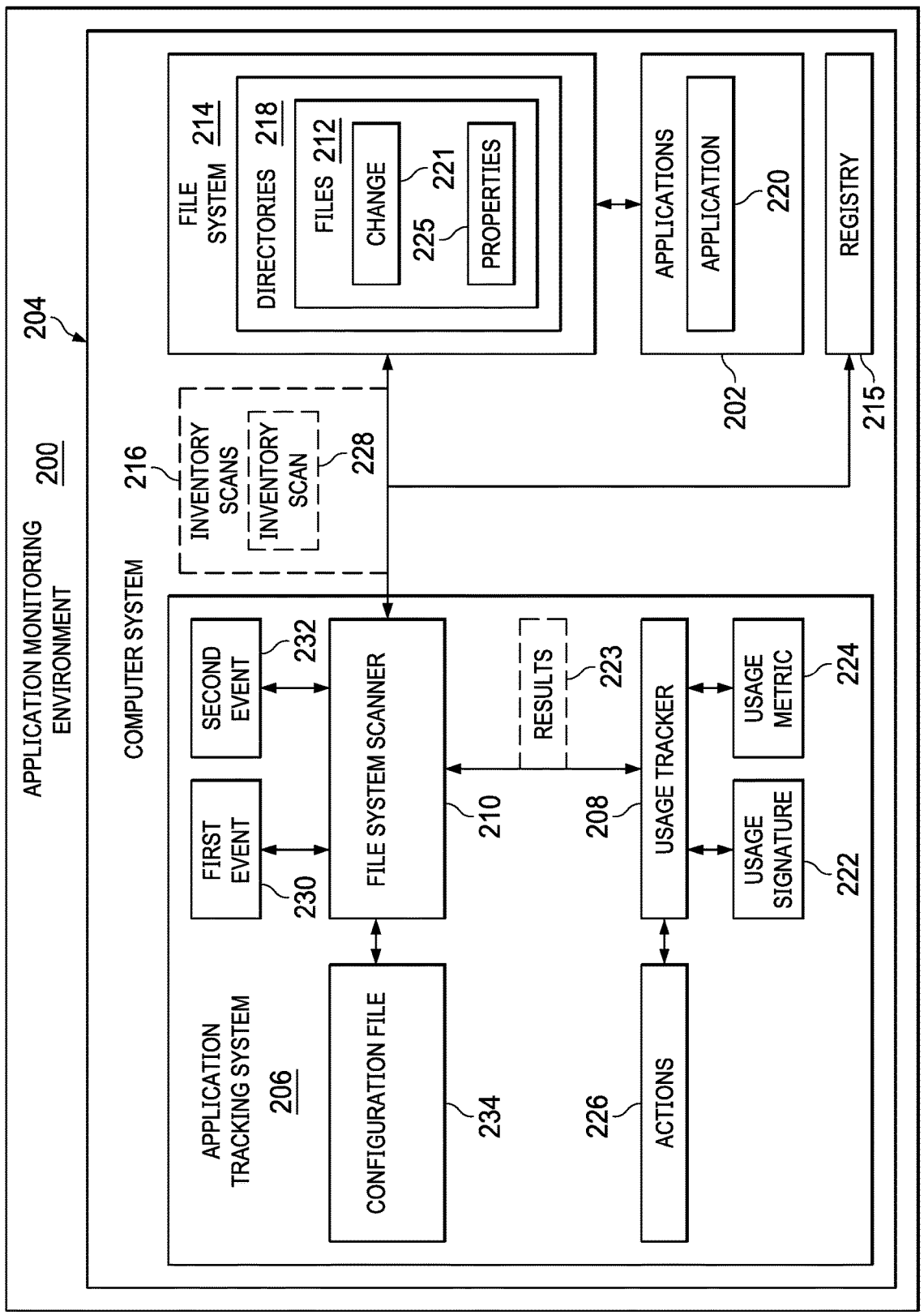
FIG. 2 is a block diagram of an application monitoring environment in accordance with an illustrative embodiment.

With reference now to FIG. 2, a block diagram of an application monitoring environment is depicted in accordance with an illustrative embodiment. In this illustrative example, application monitoring environment 200 includes components that can be implemented in hardware, such as the hardware shown in network data processing system 100 in FIG. 1.

In this illustrative example, applications 202 are installed in computer system 204. Computer system 204 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system. For example, computer system 204 could be network data processing system 100, a network within network data processing system 100 in FIG. 1, a work station, a laptop computer, a tablet computer, a kiosk, a set top box, or some other suitable type of data processing system.

Usage of applications 202 in computer system 204 can be determined by application tracking system 206. In this illustrative example, tracking usage of applications 202 can be performed utilizing usage tracker 208 and file system scanner 210.

In this illustrative example, file system scanner 210 is configured to scan files 212 in file system 214. Further, file system scanner 210 can also be configured to scan registry 215. In this depicted example, registry 215 is a hierarchal database that stores settings for an operating system and for applications.

In this example, file system scanner 210 can perform inventory scans 216 to identify files 212 present in directories 218 in file system 214. Further, inventory scans 216 can also identify other information, such as directories 218 in which files 212 are located, file sizes, changes in files 212, and other suitable information. The scanning function in file system scanner 210 can be implemented using currently available file system scanners.

In this example, usage tracker 208 operates to monitor software usage for application 220 in applications 202. For example, usage tracker 208 determines whether change 221 has occurred in a set of files 212 stored in a set of directories 218 for application 220 in file system 214 between inventory scans 216 of file system 214. A file can be selected from files 212 for inclusion in the set of files 212 if the file is one that changes when application 220 is used. In this illustrative example, application 220 is used when at least one of a user input runs application 220, a user input is utilized to log into application 220 already running, application 220 is started without user input, application 220 runs as a service, or some other operation of application 220 causes program code for application 220 to be run by a processor unit in a manner that changes the set of files 212. In other words, the use of application 220 can be based on whether a user runs the application or whether the application is run for some other reason, such as a service that runs in the background. These different types of uses of application 220 can be identified based on the selection of files 212 for use in the set of files 212.

The set of files 212 is associated with application 220. The set of files 212 can be some or all of files 212 that are present for application 220 in file system 214. The set of files 212 can be, for example, at least one of a log file, a configuration file, a trace file, a data file, a database file, or some other file that changes in response to the usage of application 220. In other words, the set of files 212 can include files 212 for application 220 that do not change. This type of selection can be made when files 212 that change based on use of application 220 are not known.

Change 221 can be detecting using usage signature 222. As depicted, usage signature 222 defines a set of files 212 for monitoring and a set of properties 225 for the set of files 212 to monitor to determine if change 221 has occurred in the set of files 212.

For example, the set of properties 225 defined in usage signature 222 can comprise at least one of a checksum for the set of files 212, content in the set of files 212, a size of the set of files 212, or some other property that can be used to detect changes to the set of files 212. In another example, summing the checksums for the set of files 212 forms a total that is the checksum for the set of files 212.

The determination of whether change 221 has occurred in the set of files 212 can be made using results 223 received from file system scanner 210. Results 223 are results of inventory scans 216. As depicted, results 223 of inventory scans 216 identify files 212 in directories 218 for applications 202 and indicate changes in files 212 from prior inventory scans of file system 214.

As depicted, usage tracker 208 adjusts usage metric 224 for application 220 to indicate a use of application 220 when the set of files 212 has changed. For example, usage metric 224 can be a binary value. In other example, usage metric 224 can be a counter. Application tracking system 206 increases accuracy of computer system 204 with usage tracker 208 in identifying application usage.

In the illustrative example, usage tracker 208 can perform a set of actions 226 in response to detecting change 221 to the set of files 212 based on usage signature 222. The set of actions 226 can be selected from at least one of generating a report of changed files in the set of files 212; analyzing licenses for application 220; removing an installation of application 220 from another file system in the computer system; removing a license for application 220 in file system 214; removing a license for application 220 from a network data processing system; installing another copy of application 220; adding a license for application 220; or some other suitable action.

File system scanner 210 can determine how many of the set of files 212 for application 220 have changed change 221 for application 220. If change 221 has occurred, file system scanner 210 reports changed files in set of files 212. If change 221 has not occurred, file system scanner 210 can report that no change has occurred in the set of files 212 for application 220.

As depicted, application tracking system 206 can scan file system 214 in response to events. For example, file system scanner 210 can perform inventory scan 228 on the entirety of file system 214 in response to first event 230. Further, file system scanner 210 can perform inventory scan 228 of the set of directories 218 for application 220 in response to second event 232. In other words, file system scanner 210 can perform inventory scan 228 of all of file system 214 or on one or more specific directories in directories 218 containing files 212 for application 220.

First event 230 and second event 232 can be periodic events. First event 230 can be a longer period of time than second event 232. The shorter period of time for second event 232 can be set knowing that scanning specific directories in directories 218 for files 212 can be performed more quickly than scanning the entirety of file system 214.

Further, first event 230 and second event 232 can also be non-periodic events. For example, these events can be in the form of user inputs, such as a user input requesting performance of inventory scan 228. The settings for first event 230, second event 232, and the identification of directories 218 for scanning can be specified in configuration file 234 used by file system scanner 210.

In the illustrative example, usage tracker 208 may be implemented in software, hardware, firmware, or a combination thereof. When software is used, the operations performed by usage tracker 208 may be implemented in program code configured to run on hardware, such as a processor unit. When firmware is used, the operations performed by usage tracker 208 may be implemented in program code and data stored in persistent memory to run on a processor unit. When hardware is employed, the hardware may include circuits that operate to perform the operations in usage tracker 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, one or more technical solutions are present that overcome a technical problem with monitoring usage of an application using currently available information about running processes for the application. One or more technical solutions use results from an inventory scan of a set of files for the application in which the results can be used to determine whether an application has been used since a prior scan of the set of files. As a result, one or more technical solutions may provide a technical effect of providing a more comprehensive manner in which application usage can be tracked. One or more technical solutions provide a technical effect of increasing the accuracy by which a computer system can identify application usage.

Application tracking system 206 can be utilized to reduce the use of resources in network data processing system 100 in FIG. 1, resulting in an improved network data processing system. Application tracking system 206 can be implemented in network data processing system 100 to identify application usage within network data processing system 100. When excess installations of applications are identified, those excess installations can be removed from network data processing system 100, resulting in increasing the availability of storage resources within network data processing system 100. Further, the use of application tracking system 206 can reduce expenses for maintaining network data processing system 100. By removing licenses for unneeded licenses of applications using reports on application usage from usage tracker 208 in application tracking system 206, can reduce licensing costs. Thus, the expense for maintaining network data processing system 100 can be reduced.

Further, improvements to network data processing system 100 in FIG. 1 can also occur in computer system 204. For example, reducing the use of resources in a data processing system within computer system 204 can occur using application tracking system 206.

As a result, computer system 204 operates as a special purpose computer system in which usage tracker 208 in computer system 204 enables tracking application usage without using process information, thereby avoiding issues with using process information to track the usage of applications. In particular, usage tracker 208 transforms computer system 204 into a special purpose computer system as compared to currently available general computer systems that do not have usage tracker 208.

Figure 3:
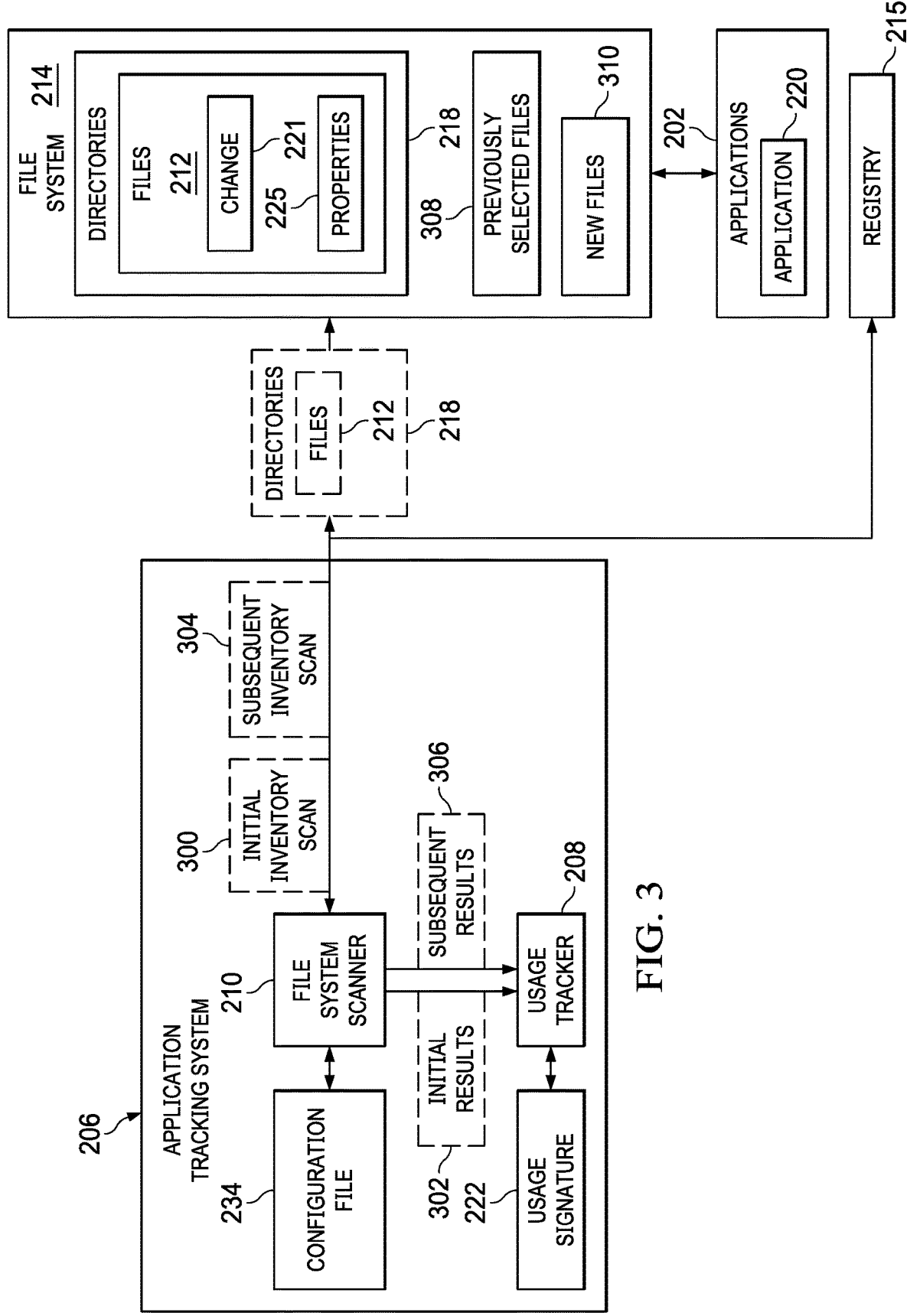
FIG. 3 is an illustration of a data flow for creating a usage signature for an application in accordance with an illustrative embodiment.

With reference now to FIG. 3, an illustration of a data flow for creating a usage signature for an application is depicted in accordance with an illustrative embodiment. In the illustrative examples, the same reference numeral may be used in more than one figure. This reuse of a reference numeral in different figures represents the same element in the different figures.

The data flow in FIG. 3 illustrates one manner in which usage signature 222 can be created or modified for application 220. This data flow may be applied to usage signatures for other applications in applications 202 installed in file system 214, as well as applications on other files systems.

In this illustrative example, file system scanner 210 performs initial inventory scan 300 of file system 214. Initial inventory scan 300 is a scan of all of files 212 in file system 214. File system scanner 210 can also scan registry 215 for file system 214. This initial scan is performed to identify all of directories 218 and files 212 in directories 218 that are present for applications 202 installed in file system 214. File system scanner 210 can also scan registry 215 for file system 214 as part of initial inventory scan 300.

Scanning registry 215 can yield information about files 212. The information can include at least one of settings, options, or other types of information about applications 202. Initial results 302 are generated from initial inventory scan 300.

As depicted, initial results 302 are analyzed by usage tracker 208 to identify a set of files 212 for application 220. The set of files 212 for application 220 is located in a set of directories 218 for application 220. Usage tracker 208 selects a set of files 212 from initial results 302 of initial inventory scan 300 of file system 214. For example, usage tracker 208 selects the set of files 212 as one or more files that change when application 220 has been used.

The selection of one or more files 212 for the set of files 212 in usage signature 222 can be made in a number of different ways. For example, an identification of an application for which software usage is to be tracked can be found in configuration file 234. Additionally, configuration file 234 may also contain file types that change when an application is used by a user. In other illustrative examples, the selection of files 212 can be made through user input.

In one illustrative example, the set of files 212 can be selected as files 212 for application 220 that change when application 220 is used by a user. For example, the set of files 212 can be one or more of files 212 that change when a user generates user input that results in at least one of starting application 220, interacting with application 220, terminating application 220, or some other user input that results in the operation of application 220. In another illustrative example, the set of files 212 can be selected as files 212 that change when application 220 runs even without user input. In other illustrative examples, the set of files 212 can be selected as files 212 that change when application 220 runs with user input, without user input, or combination thereof.

As a result, different types of uses of application 220 can be detected as compared to currently used techniques. In this manner, usage tracker 208 using usage signature 222 causes computer system 204 to be a special purpose computer system as compared to other computer systems that do not include this or other features described in the different illustrative examples.

Additionally, usage tracker 208 selects a set of properties 225 that are to be monitored in the set of files 212. The set of properties 225 can be compared from one scan to another scan to determine whether any of the set of properties 225 changes to indicate the use of application 220. For example, the set of properties 225 includes at least one of a checksum for the set of files 212, content in the set of files 212, a size of the set of files 212, or some other property for detecting changes to the set of files 212.

In this depicted example, the checksum for the set of files 212 can comprise a checksum for each file in the set of files 212. In other words, the checksum for the set of files 212 can be one or more checksums. For example, the checksums can be summed to form a single check sum. The set of checksums for the set of files 212 can be obtained from initial results 302. File system scanner 210 can provide checksums for files 212 as part of scanning file system 214.

In another illustrative example, the set of files 212 is selected by usage tracker 208 as all of files 212 for application 220. This option can be used if it is unclear which ones of files 212 for application 220 will change when application 220 is used by a user. Thus, the set of files 212 and the set of properties 225 are used by usage tracker 208 to form usage signature 222.

Also, usage signature 222 can change over time. For example, when subsequent inventory scan 304 is run after initial inventory scan 300, the set of files 212 for use in usage signature 222 can be changed by usage tracker 208 based on subsequent results 306 obtained from subsequent inventory scan 304. For example, the set of files 212 in usage signature 222 can be selected by usage tracker 208 as a set of previously selected files 308 for application 220 or a set of new files 310.

The set of new files 310 may be selected by usage tracker 208 in response to changes in the composition of files 212 in the set of directories 218 for application 220. the selection of the set of new files 310 can be based on identifying new files 310 that have changed for application 220 that have not previously been changed. In other words, new files 310 may be identified that also indicate a use of application 220. New files 310 can be added or used to replace current files in the set of files 212. The set of new files 310 includes the set of files 212 previously selected, as well as one or more new files 212 that changed in the set of directories 218 for application 220.

In other words, the set of new files 310 may be added by usage tracker 208 to the set of previously selected files 308 to form the set of files 212 for forming usage signature 222 for application 220. In this manner, one or more of files 212 may be added to the set of files 212.

In another illustrative example, the set of new files 310 can replace one or more of previously selected files 308 if a determination is made that those files did not show usage of application 220. This selection of files 212 can take into account files that may change in response to application usage but were previously unknown or unselected.

Thus, usage tracker 208 can select the set of files 212 for usage signature 222 for application 220 in a number of different ways. As depicted above, usage signature 222 can be based on all files in files 212 located in the set of directories 218, or selected files in files 212 located in the set of directories 218. Further, the set of files 212 from which usage signature 222 is formed can vary over time.

The illustration of application monitoring environment 200 in FIG. 2 and the different components in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, application tracking systems 206 can be used to track applications in one or more file systems in addition to or in place of file system 214. The illustrative example shows tracking usage of application 220. The usage of other applications having files 212 in file system 214 also can be tracked by application tracking system 206.

Further, although file system scanner 210 is shown as a separate component from usage tracker 208, the functions in these two components can be implemented as a single program or application. For example, file system scanner 210 can be modified to include operations performed by usage tracker 208.

As yet another example, a file system scanner can be located on each data processing system in computer system 204. The results of scanning file systems by the file system scanners can be sent to usage tracker 208 located on a single data processing system. In other words, different components may be distributed or centralized within computer system 204 depending on the particular implementation.

As another example, file system scanner 210 can include an artificial intelligence system. The artificial intelligence system is a system that is based on a function of the human brain. An artificial intelligence system comprises at least one of a neural network, a cognitive system, a Bayesian network, fuzzy logic, an expert system, a natural language system, or some other suitable system. The artificial intelligence system can be used to select the set of files 212 and form usage signature 222 for application 220. Further, the artificial intelligence system can be used to select and perform actions 226.

Figure 4:
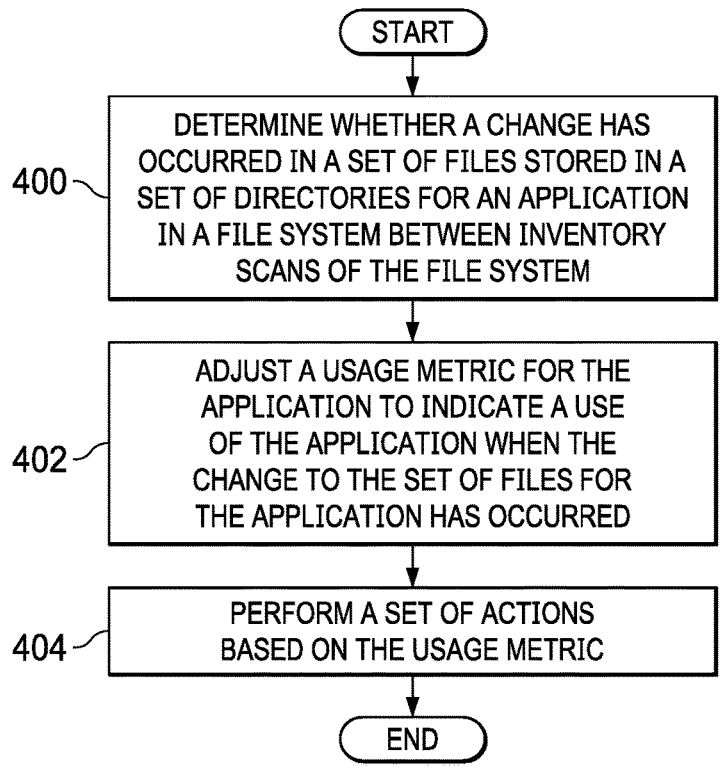
FIG. 4 is a flowchart of a process for monitoring software usage in accordance with an illustrative embodiment.

Turning next to FIG. 4, a flowchart of a process for monitoring software usage is depicted in accordance with an illustrative embodiment. The process in FIG. 4 can be implemented in hardware, software, or both. When implemented in software, the process can take the form of program code that is run by one of more processor units located in one or more hardware devices in one or more computer systems. For example, this process can be implemented in usage tracker 208 running on computer system 204 in FIG. 2.

The process begins by determining whether a change has occurred in a set of files stored in a set of directories for an application in a file system between inventory scans of the file system (step 400). The set of files is associated with the application and the set of files changes when the application is used.

The process adjusts a usage metric for the application to indicate a use of the application when the change to the set of files for the application has occurred (step 402). The process performs a set of actions based on the usage metric (step 404). The process terminates thereafter.

The set of actions can take a number of different forms. For example, the set of actions includes at least one of generating a report; analyzing licenses for the application; removing an installation of the application from another file system in the computer system; removing a license for the application in a computer system; removing a license for the application from a network data processing system; installing another copy of the application; adding a license for the application; or some other suitable action.

The process in FIG. 4 increases accuracy by the computer system in identifying application usage. Further, the process also can reduce the use of resources in the computer system. For example, when excess installations of an application are identified, the amount of storage resources can be freed up in the computer system through removing the excess installations. Additionally, expenses that occur in maintaining the computer system can be reduced by reducing the number of licenses based on an identification of the use of the application through examining the usage signature. Costs for maintaining a computer system can be reduced using this process.

Further, the computer system can have improved performance when additional installations or licenses are added in response to identifying certain levels of usage of the application. By increasing at least one of installations or licenses, clients or users using the application can have increased access or reduced response time without having to wait for an installation or a license seat to free up for the application.

Figure 5:
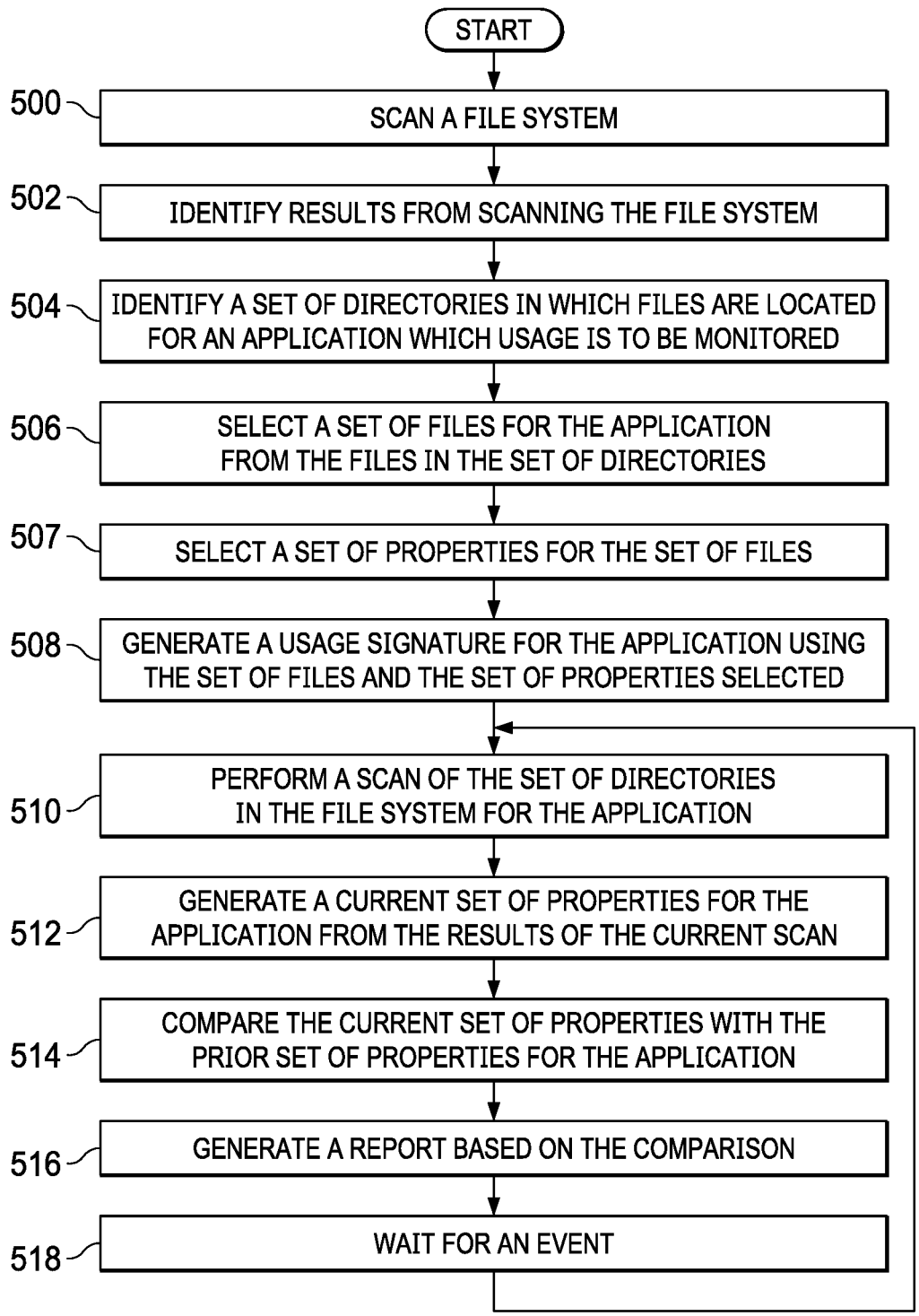
FIG. 5 is a more detailed flowchart of a process for monitoring software usage for an application in accordance with an illustrative embodiment.

With reference next to FIG. 5, a more detailed flowchart of a process for monitoring software usage for an application is depicted in accordance with an illustrative embodiment. The process in FIG. 5 can be implemented in hardware, software, or both. When implemented in software, the process can take the form of program code that is run by one of more processor units located in one or more hardware devices in one or more computer systems. For example, this process can be implemented in application tracking system 206 running on computer system 204 in FIG. 2.

The process begins by scanning a file system (step 500). This step can be performed as part of an inventory scan using file system scanner 210 in FIG. 2 and is an initial inventory scan. The process identifies results from scanning the file system (step 502). In step 502, the results include, for example, an identification of files, locations of files, the size of files, a checksum for files, or other suitable information about files in the file system.

The process identifies a set of directories in which files are located for an application which usage is to be monitored (step 504). The process selects a set of files for the application from the files in the set of directories (step 506). In step 506, the set of files is selected as files that are expected to change when the application is used by a user. For example, a set of files may include at least one of a log file, a configuration file, a trace file, a data file, a database file, or some other suitable type of file. In this manner, the use of the application by a user can be identified with more certainty as opposed to web applications in which a process for an application may run even when the user is not logged into the application or using process information.

Next, the process selects a set of properties for the set of files (step 507). The set of properties can be selected in a number of different ways. For example, the set of properties can be selected based on user input, preselected properties in a configuration file, or in some other manner. The set of properties may be, for example, a set of checksums, a set of sizes for the set of files, content in the set of files, or some other suitable property of the set of files that changes when the application is used. The process generates a usage signature for the application using the set of files and the set of properties selected (step 508).

The process performs a scan of the set of directories in the file system for the application (step 510). The scan in step 510 scans files in each of the directories in the set of directories. This scan of the file system in step 510 is a current inventory scan for the set of directories for the application. The process generates a current set of properties for the application from the results of the current scan (step 512).

The process compares the current set of properties with the prior set of properties for the application (step 514). The prior set of properties were identified from the previous scan of the set of files in the file system. Depending on the form of the usage signature, changes can be identified. The process generates a report based on the comparison (step 516). This report can be used to perform different actions.

The process then waits for an event (step 518). When the event occurs, the process returns to step 510.

Figure 6:
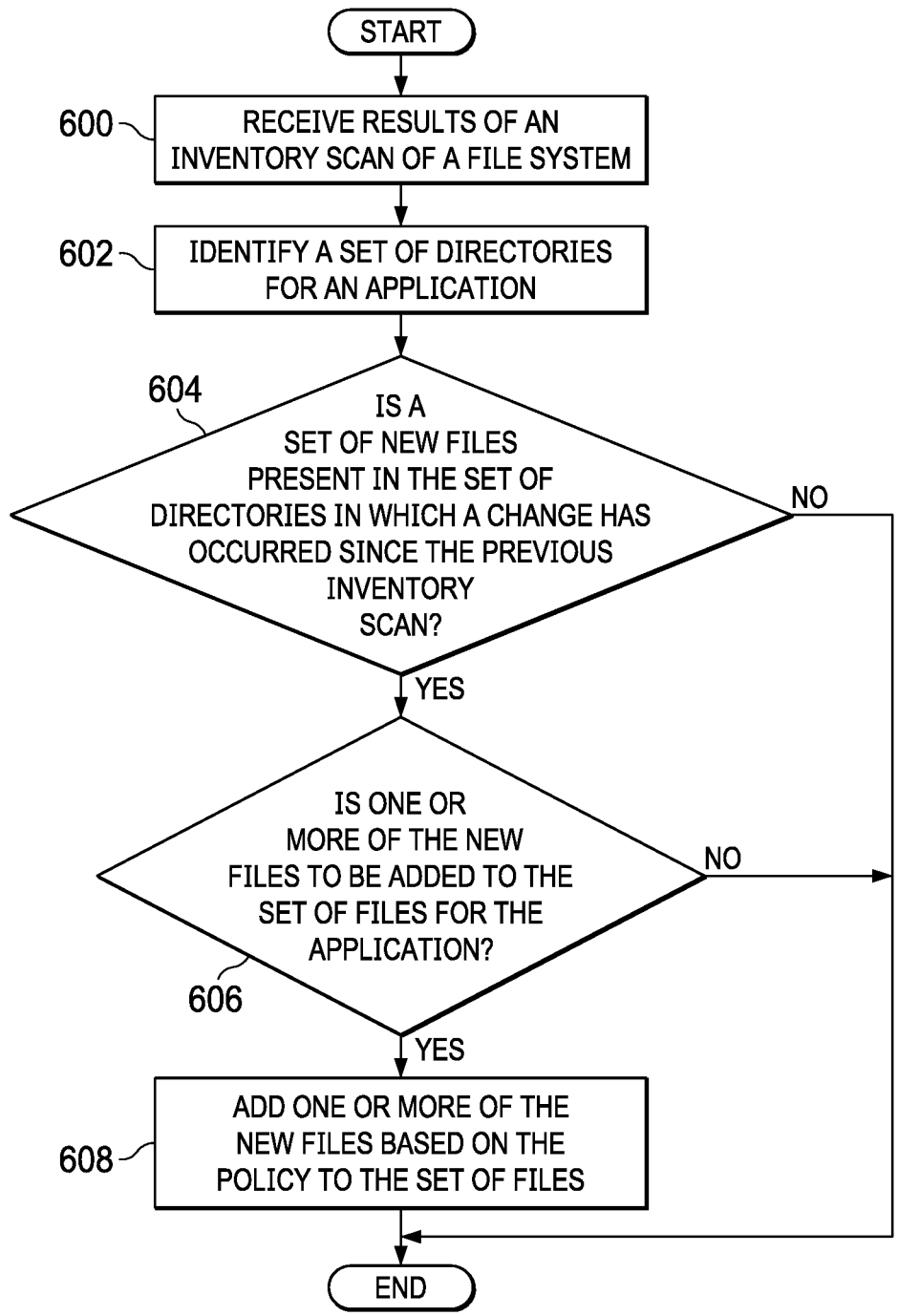
FIG. 6 is a flowchart of a process for changing a set of files for a usage signature in accordance with an illustrative embodiment.

With reference next to FIG. 6, a flowchart of a process for changing a set of files for a usage signature is depicted in accordance with an illustrative embodiment. The process in FIG. 6 can be implemented in hardware, software, or both. When implemented in software, the process can take the form of program code that is run by one of more processor units located in one or more hardware devices in one or more computer systems. For example, this process can be implemented in application tracking system 206 running on computer system 204 in FIG. 2.

The process begins by receiving results of an inventory scan of a file system (step 600). The process identifies a set of directories for an application (step 602). The process determines whether a set of new files is present in the set of directories in which a change has occurred since the previous inventory scan (step 604). In step 604, the process looks for files that have been added or for previous files not in the set of files in which the files have changed since a prior inventory scan.

If a new set of files is present, a determination is made as to whether one or more of the new files are to be added to the set of files for the application (step 606). The set of files for the files currently selected are used in creating the usage signature for the application. The determination in step 606 can be performed by requesting a user input. The determination also may be made using a signature policy. The signature policy is a set of rules that specify when a new file should be added to the set of files. The policy may also include data that is used to apply the rules.

In step 606, if the determination is to add one or more of the new files, the process adds one or more of the new files based on the policy to the set of files (step 608). The process terminates thereafter. In step 606, if one or more of the new files are not added, the process also terminates. With reference again to step 604, if a set of new files is not present, the process terminates.

The process in FIG. 6 can be performed each time results are received from an inventory scan. This process can be used to change the usage signature for the application over time. For example, updates or patches to the application may cause new files to be included or created that change when the application is run. The process in FIG. 6 can take into account these changes in situations in which the type of use of the application by a user results in different files being changed for the application. In this manner, the usage signature can be updated to more accurately identify usage of an application.

Figure 7:
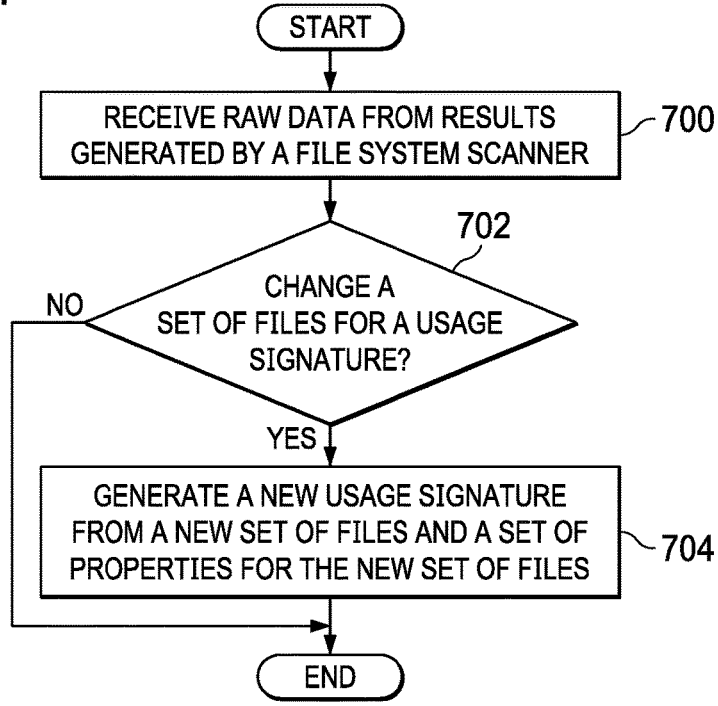
FIG. 7 is a flowchart of a process for changing a usage signature in accordance with an illustrative embodiment.

With reference to FIG. 7, a flowchart of a process for changing a usage signature is depicted in accordance with an illustrative embodiment. The process illustrated in FIG. 7 can be performed using usage tracker 208 in FIG. 2. The process in FIG. 7 shows interactions between a user and usage tracker 208 that may be used to change usage signature 222 in FIG. 2.

The process begins by receiving raw data from results generated by a file system scanner (step 700). These raw results include a list of files which can change from scan to scan in a directory in which an application is installed.

The process determines whether to change a set of files for a usage signature (step 702). This determination can be made by a user reviewing the list of files and providing user input as to whether the composition of the set of files should be changed. For example, the user may add or remove files based on reviewing the list of files in the raw data.

If the set of files is to be changed, a new usage signature is generated from a new set of files and a set of properties for the new set of files (step 704). The process terminates thereafter. With reference again to step 702, if the set of files for the usage signature does not change, the process terminates. Although not shown, the set of properties also may be changed for the set of files through user input or some other mechanism.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
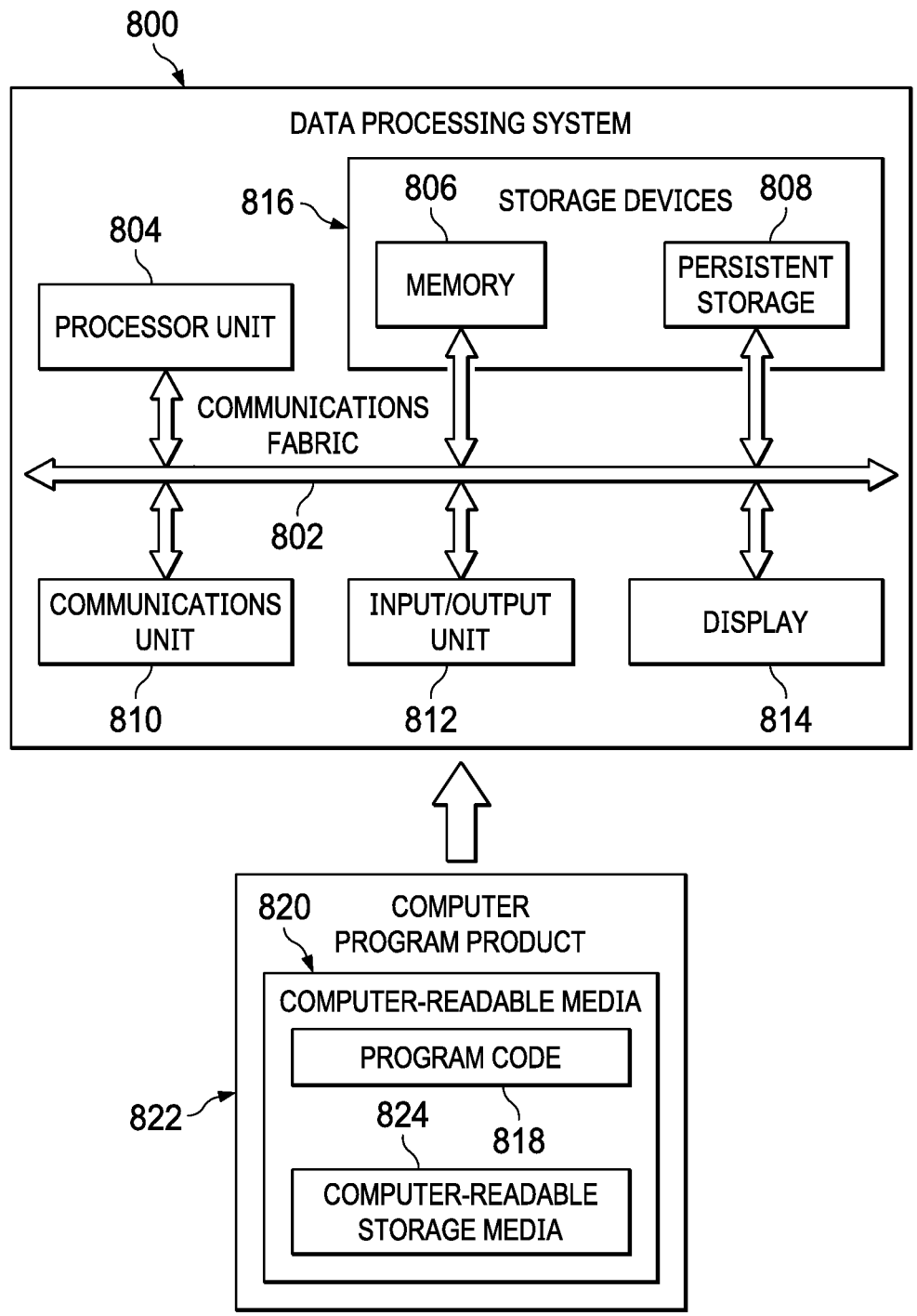
FIG. 8 is a block diagram of a data processing system in accordance with an illustrative embodiment.

Turning now to FIG. 8, a block diagram of a data processing system is depicted in accordance with an illustrative embodiment. Data processing system 800 may be used to implement server computer 104, server computer 106, client devices 110 in FIG. 1, and computer system 204 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid-state drive (SSD), a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 may be transferred to data processing system 800 using a computer-readable signal media. The computer-readable signal media may be, for example, a propagated data signal containing program code 818. For example, the computer-readable signal media may be at least one of an electromagnetic signal, an optical signal, or any other suitable type of signal. These signals may be transmitted over at least one of communications links, such as wireless communications links, optical fiber cable, a coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, the illustrative embodiments of the present invention provide a computer implemented method, computer system, and computer program product for monitoring usage of an application installed in a computer system. The computer system, running a usage tracker, determines whether a change has occurred in a set of files stored in a set of directories for the application in a file system between inventory scans of the file system. The set of the files is associated with the application and the set of the files changes when the application is used. The computer system adjusts a usage metric for the application to indicate a use of the application when the usage signature has changed, increasing accuracy, by the computer system, in identifying application usage.

As a result, one or more technical solutions are present that overcome a technical problem with monitoring usage of an application using currently available information about running processes for the application. One or more technical solutions use results from an inventory scan of a set of files for the application in which the results can be used to determine whether the application has been used since a prior scan of the set of the files. As a result, one or more technical solutions may provide a technical effect of providing a more comprehensive manner in which application usage can be tracked. One or more technical solutions provide a technical effect of increasing the accuracy by which a computer system can identify application usage.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for monitoring software usage for an application installed in a computer system, the method comprising:
 performing, by the computer system, an inventory scan, wherein results of the inventory scan identify files in directories for applications and indicate changes in the files from a prior inventory scan of the file system;
 determining, by the computer system, whether a change has occurred in a set of files stored in a set of directories for the application in a file system between inventory scans of the file system, wherein the set of the files is associated with the application and the set of the files changes when the application is used, and wherein the change in the set of the files is detected using a usage signature; and
 adjusting, by the computer system, a usage metric for the application to indicate a use of the application when the change has occurred in the set of the files stored in the set of directories for the application, increasing accuracy, by the computer system, in identifying application usage.

2. The method of claim 1 further comprising:
 selecting, by the computer system, the set of the files from results of an inventory scan of the file system.

3. The method of claim 2, wherein the selecting step comprises:
 selecting, by the computer system, the set of the files from at least one of a set of previously selected files for the application or a set of new files in which changes have occurred in the files in the set of the directories for the application.

4. The method of claim 1 further comprising:
 performing, by the computer system, an inventory scan of all of the file system in response to a first event; and
 performing, by the computer system, the inventory scan of the set of the directories for the application in response to a second event.

5. The method of claim 1 further comprising:
 determining, by the computer system, how many of the set of the files have changed in response to the change in the set of the files; and
 reporting changed files in the set of the files.

6. The method of claim 1, wherein the usage signature comprises at least one of a checksum for the set of the files, content of the set of the files, or a size of the set of the files.

7. The method of claim 1, wherein the set of the files comprises at least one of a log file, a configuration file, a trace file, a data file, or a database file.

8. An application tracking system comprising:
 a computer system; and
 a usage tracker running on the computer system, wherein the usage tracker performs an inventory scan, wherein results of an inventory scan identify files in directories for applications and indicate changes in the files from a prior inventory scan of the file system, wherein the usage tracker determines whether a change has occurred in a set of files stored in a set of directories for an application in a file system between inventory scans of the file system, wherein the set of the files is associated with the application and the set of the files changes when the application is used, and wherein the change in the set of the files is detected using a usage signature; and adjusts a usage metric for the application to indicate a use of the application when the change has occurred in the set of the files stored in the set of directories for the application, increasing accuracy, by the computer system, in identifying application usage.

9. The application tracking system of claim 8, wherein the usage tracker selects the set of the files from results of an inventory scan of the file system.

10. The application tracking system of claim 9, wherein in selecting the set of the files, the usage tracker selects the set of the files from least one of a set of previously selected file for the application or a set of new files in which changes have occurred in the files in the set of the directories for the application.

11. The application tracking system of claim 8, wherein the usage tracker performs the inventory scan of all of the file system in response to a first event; and performs an inventory scan of the set of the directories for the application in response to a second event.

12. The application tracking system of claim 8, wherein the usage tracker determines how many of the set of the files have changed in response to the change in the set of the files and reports changed files in the set of the files.

13. The application tracking system of claim 8, wherein the using a usage signature comprises at least one of a checksum for the set of the files, a set of checksums for the set of the files, content of the set of the files, or a size of the set of the files.

14. The application tracking system of claim 8, wherein the set of the files comprises at least one of a log file, a configuration file, a trace file, a data file, or a database file.

15. A computer program product for monitoring software usage for an application installed in a computer system, the computer program product comprising:
- a computer-readable storage media;
- first program code, stored on the computer-readable storage media, for performing an inventory scan, wherein results of the inventory scan identify files in directories for applications and indicate changes in the files from a prior inventory scan of the file system;
- second program code, stored on the computer-readable storage media, for determining whether a change has occurred in a set of files stored in a set of directories for the application in a file system between inventory scans of the file system, wherein the set of the files is associated with the application and the set of the files changes when the application is used, and wherein the change in the set of the files is detected using a usage signature; and
- third program code, stored on the computer-readable storage media, for adjusting a usage metric for the application to indicate a use of the application when the change has occurred in the set of the files stored in the set of directories for the application, increasing accuracy, by the computer system, in identifying application usage.

16. The computer program product of claim 15 further comprising:
- third program code, stored on the computer-readable storage media, for selecting the set of the files from results of an inventory scan of the file system.

17. The computer program product of claim 16, wherein the third program code comprises:
- program code, stored on the computer-readable storage media, for selecting the set of the files from at least one of a set of previously selected files for the application or a set of new files, in which changes have occurred in the files for the set of the directories for the application.

18. The computer program product of claim 15 further comprising:
- third program code, stored on the computer-readable storage media, for performing an inventory scan of all of the file system in response to a first event; and
- fourth program code, stored on the computer-readable storage media, for performing the inventory scan of the set of the directories for the application in response to a second event.

* * * * *